United States Patent [19]

Lee

[11] Patent Number: 5,790,375

[45] Date of Patent: Aug. 4, 1998

[54] LOCKING DEVICE FOR LOCKING A NOTE BOOK COMPUTER ONTO A DOCKING STATION

[75] Inventor: Cheon-Yeol Lee, Seoul, Rep. of Korea

[73] Assignee: SamSung Electronics Co., Ltd., Suwon, Rep. of Korea

[21] Appl. No.: 647,625

[22] Filed: May 15, 1996

[30] Foreign Application Priority Data

Jun. 14, 1995 [KR] Rep. of Korea ............ 15757/1995

[51] Int. Cl.$^6$ .................... G06F 1/16; H05K 7/12
[52] U.S. Cl. .................... 361/686; 361/726
[58] Field of Search .................... 361/683, 686, 361/724–727, 759; 364/708.1; G06F 1/16

[56] References Cited

U.S. PATENT DOCUMENTS

| | | |
|---|---|---|
| 4,969,830 | 11/1990 | Daly et al. . |
| 5,396,400 | 3/1995 | Register et al. . |
| 5,450,271 | 9/1995 | Fukushima et al. . |
| 5,488,572 | 1/1996 | Belmont . |
| 5,507,661 | 4/1996 | Honda et al. ............ 439/347 |

FOREIGN PATENT DOCUMENTS

| | | | |
|---|---|---|---|
| 530829 | 10/1993 | European Pat. Off. . | |
| 405 100772 | 4/1993 | Japan . | |
| 406083484 | 3/1994 | Japan | ............ 361/686 |
| WO 94/00808 | 1/1994 | WIPO . | |

*Primary Examiner*—Leo P. Picard
*Assistant Examiner*—Lynn D. Feild
*Attorney, Agent, or Firm*—Robert E. Bushnell, Esq.

[57] ABSTRACT

A locking and detent mechanism for a notebook computer and a docking station, that allows the user to securely engage, disengage, and eject the notebook computer from the docking station by operating a single control feature, the handle bar. The present invention also allows the user to accomplish the above tasks with little effort, little dexterity, with a high degree of stability, and without requiring that the device be plugged in. The device consists of clusters of parts installed within the docking station, including the handle mechanism, the push-slide mechanism, the lever mechanism, the locking mechanism, and the ejecting mechanism, where the handle mechanism is at an opposite end of the device from the locking mechanism. The mechanical engagement/disengagement of the notebook computer from the docking station is accomplished simultaneous to the electrical engagement/disengagement, simplifying the procedure for the user. A safety detent mechanism prevents the inadvertent disengagement of the notebook computer from the docking station by preventing the inadvertent pivoting of the handle bar.

19 Claims, 7 Drawing Sheets

LOCKING DEVICE FOR LOCKING A NOTE BOOK COMPUTER ONTO A DOCKING STATION

CROSS-REFERENCE TO RELATED APPLICATIONS

This application makes reference to, incorporates the same herein, and claims all benefits accruing under 35 U.S.C. §119 arising from an application for *Locking Device For Locking A Note Book Computer Onto A Docking Station* earlier filed in the Korean Industrial Property Office on 14 Jun. 1995 and there duly assigned Ser. No. 15757/1995.

FIELD OF THE INVENTION

The present invention concerns a locking device for locking a notebook computer onto a docking station where there are installed peripheral devices such as CD-ROM drive, speakers, etc.

BACKGROUND OF THE INVENTION

Notebook computers are often used in conjunction with peripheral devices such as RAMS, speakers, modems and external memories. Often, these peripheral devices are combined and located in a single module called a docking station. A notebook computer may be connected and disconnected from these peripheral devices by engaging or disengaging the notebook from the docking station. Currently, these are numerous mechanisms available to engage and disengage a notebook computer to and from a docking station. Most of these mechanisms are concealed from view, while securing and releasing the notebook from the docking station.

One exemplary device found in U.S. Pat. No. 4,969,830 for a *Connection Between Portable Computer Components* to Daly, shows a concealed mechanism for attaching a portable notebook computer to a peripheral device. In Daly, the computer can be attached and detached from an expansion module by two pairs of hooks engaging and disengaging two pairs of apertures. The locking hooks of the expansion module engage and disengage the slotted holes of the computer and the hooking elements of the module engage, and disengage from apertures in the computer. To disengage, the user presses a button in an opening. Finger pressure on the button will cause a slidable bracket to push back against spring flanges, thereby causing the hooks to retract from the apertures allowing for the disengagement of the computer from the module. The electrical connection is made to the underside of the notebook computer. As no ejection mechanism is provided, the user must simultaneously lift the notebook computer off the docking station while pressing the button so that the hooks of the docking station are prevented from being bias to the latched position.

A more recent design, U.S. Pat. No. 5,450,271 for a *Portable Computer Docking Apparatus Including A Key Mechanism Controlling A Power Supply and a Locking Mechanism to Fukushima*, also shows a concealed computer docking mechanism in which a portable computer is slid onto a base by way of guides and a groove, thereby preventing detachment via upward movement. The electrical connector on the docking station is attached to the rear of the notebook computer when the notebook computer is slid onto the docking station. To prevent detachment via lateral movement, a key mechanism of a lock mechanism enables a stopper to move up thus preventing the computer from being slid off of the base docking station. There is no ejection mechanism to detach the notebook computer from the docking station. Another recent design, U.S. Pat. No. 5,488,572 for a *Portable Computer System For Docking to an Expansion Base Unit* to Belmont, discloses a notebook computer docking station that accommodates a notebook computer. A pair of hooks tend to hold the notebook securely onto the base unit, thereby enabling electrical connection between the notebook computer and the base unit. Belmont contains an ejection feature, albeit one that operates with the aid of a motor. U.S. Pat. No. 5,396,400 for a *Convertible Computer Apparatus Acting as a Desk-Top Computer or a Docking Station* to Register discloses a docking station where the housing for the docking station contains an opening to accommodate a notebook computer and a keyboard. The keyboard and the notebook are slid into the channel of a pair of guides until electrical contact is made with a pintype connector plug in the housing. This docking station apparatus to lack any mechanism for disengaging the notebook computer.

European Patent No. 530,829 for an *Electronic Apparatus System Having an Electronic Apparatus Unit and an Expansion Unit for Expanding the Function of the Electronic Apparatus Unit* to Hosoya contains a feature which allows the base unit of a notebook computer to attach onto an expansion unit or docking station without causing problems with bulkiness or interference with the keyboard or without requiring excess force to operate. In Hosoya, the electrical connection is made to the underside of the notebook computer. By sliding a knob of an operation lever, a pair of hooks are disengaged so that the electronic notebook can be removed from the case. FIG. 10 of Hosoya illustrate how the operation lever of this latching mechanism moves a link or a slider either left or right causing a pair of slide plates to move orthogonally to the slider via camming action between the slider link and slide plates. As the slide plates are translated, the hooks, which are monolithically integrated with the slider plates, become either engaged or disengaged from a pair of apertures in the notebook computer. Additional control features must be operated however, by the user to engage or disengage the electrical connection between the notebook computer and the docking station. Moreover, in addition to sliding the lever, the user must concurrently operate a push button and must move a push plate in order to engage or disengage the notebook computer from the docking station.

WP 94/00808 discloses a docking station with a concealed mechanism for engaging and disengaging a portable computer, where the portable computer may be electrically coupled to the docking station. The docking station also accommodates a keyboard and a mouse. JP 405100772 to Shirota discloses a docking station engaging and disengaging a personal computer via a pair of engaging projections and an engaging groove. This device appears to lack an easily operable mechanism for ejecting the notebook computer from the docking station.

SUMMARY OF THE INVENTION

It is therefore an object of this invention to provide a user with a simple mechanism for engaging and disengaging a notebook computer from a docking station.

It is also an object to provide a user a mechanism for both disengaging and ejecting a notebook computer from a docking station by the movement of a single control feature.

It is yet another object to provide a user a mechanism for easily engaging, disengaging, and ejecting a notebook computer from a docking station that does not rely on electricity.

It is still another object to provide a user with a control feature that is easy to maneuver and operate, requiring little force and little in the way of dexterity skills on the part of a user when attempting to engage, disengage, or eject a notebook computer from a docking station or to carry the docking station.

It is also an object to provide a mechanism for engaging and disengaging a notebook computer from a docking station where the latching mechanism is on opposite sides of the device from the user operated control features that activate the latching mechanism.

It is also another object to provide a detent mechanism to prevent the inadvertent disengagement of the notebook computer from the docking station by preventing the inadvertent movement of the user operated control feature that would cause the notebook computer to become disengaged from the docking station.

These and other objects may be achieved by a computer docking station where the user maneuvers a handle bar on the docking station to either engage, disengage, or eject the notebook from the docking station. The invention achieves the above objects with clusters of parts arranged with the handle mechanism, a push-slide mechanism, a lever mechanism, a locking mechanism, and a ejecting mechanism. By using resilient coil springs, this invention achieves the above objects without the use of electricity, allowing a user to selectively engage, disengage, or eject the notebook computer from the docking station without requiring that docking station be electrically plugged in to a source of electrical power. Electrical connection with the docking station is made at the rear of the notebook computer, allowing the ejecting mechanism to sever the electrical connection upon disengagement and ejection. The handle bar extends across the entire rear side of the device, is pivoted about a hinge, and is on the opposite side of the device from the locking mechanism, thus allowing a user to apply minimal force to the handle bar and to provide better stability when attempting to engage, disengage, or eject the notebook computer from the docking station while providing a convenient mechanism for carrying the docking station.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
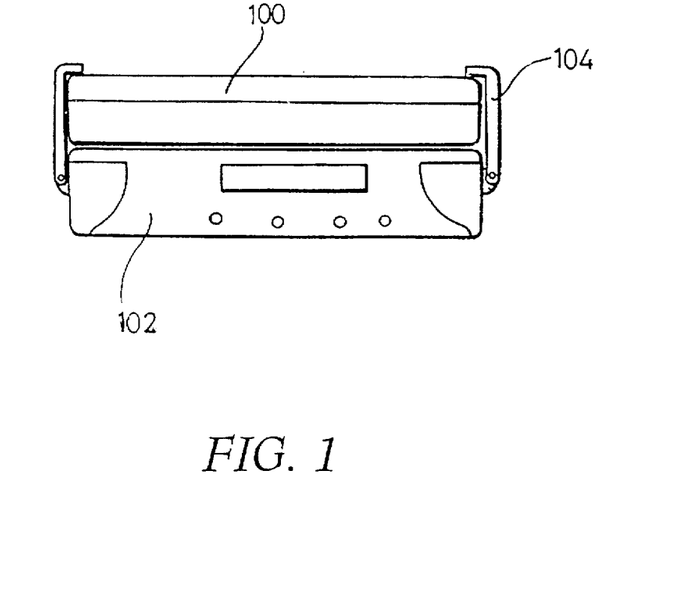
FIG. 1 is a schematic diagram providing an abstract representation for illustrating a hypothetical composite of a conventional device for locking a notebook computer onto a docking station.

Referring to FIG. 1, a conventional device is shown where locking members 104, attached to docking station 102, engage and disengage notebook computer 100. Locking members 102 not only require a substantial force to activate, but also give an awkward external appearance. In addition, they often interfere with the operation of the keyboard. Moreover, a motion owing to the keyboard operation may cause the detachment of a connector electrically connecting the notebook computer with the docking station.

Figure 2:
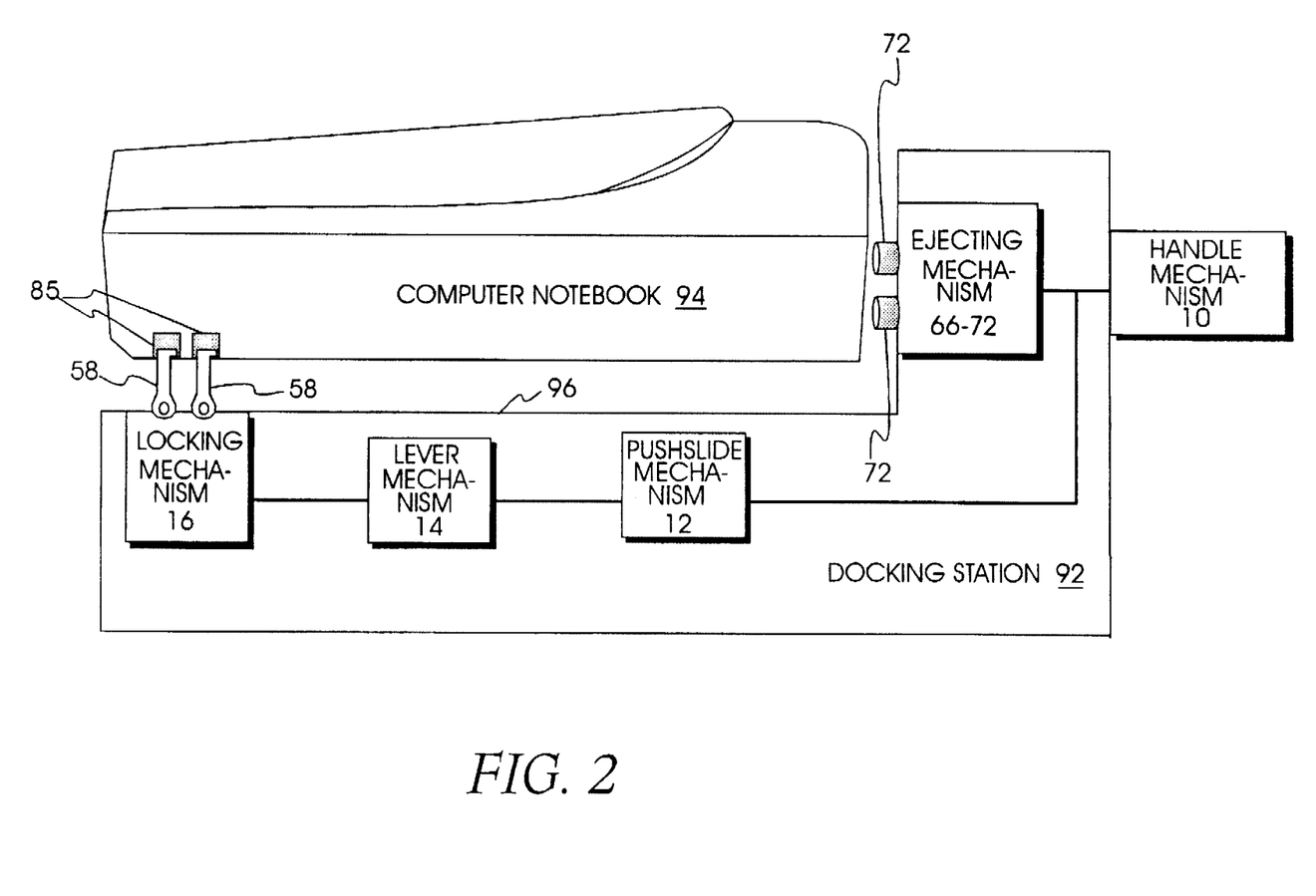
FIG. 2 is a block diagram of the present invention showing the part clusters and how they interrelate with other part clusters.
Figure 3:
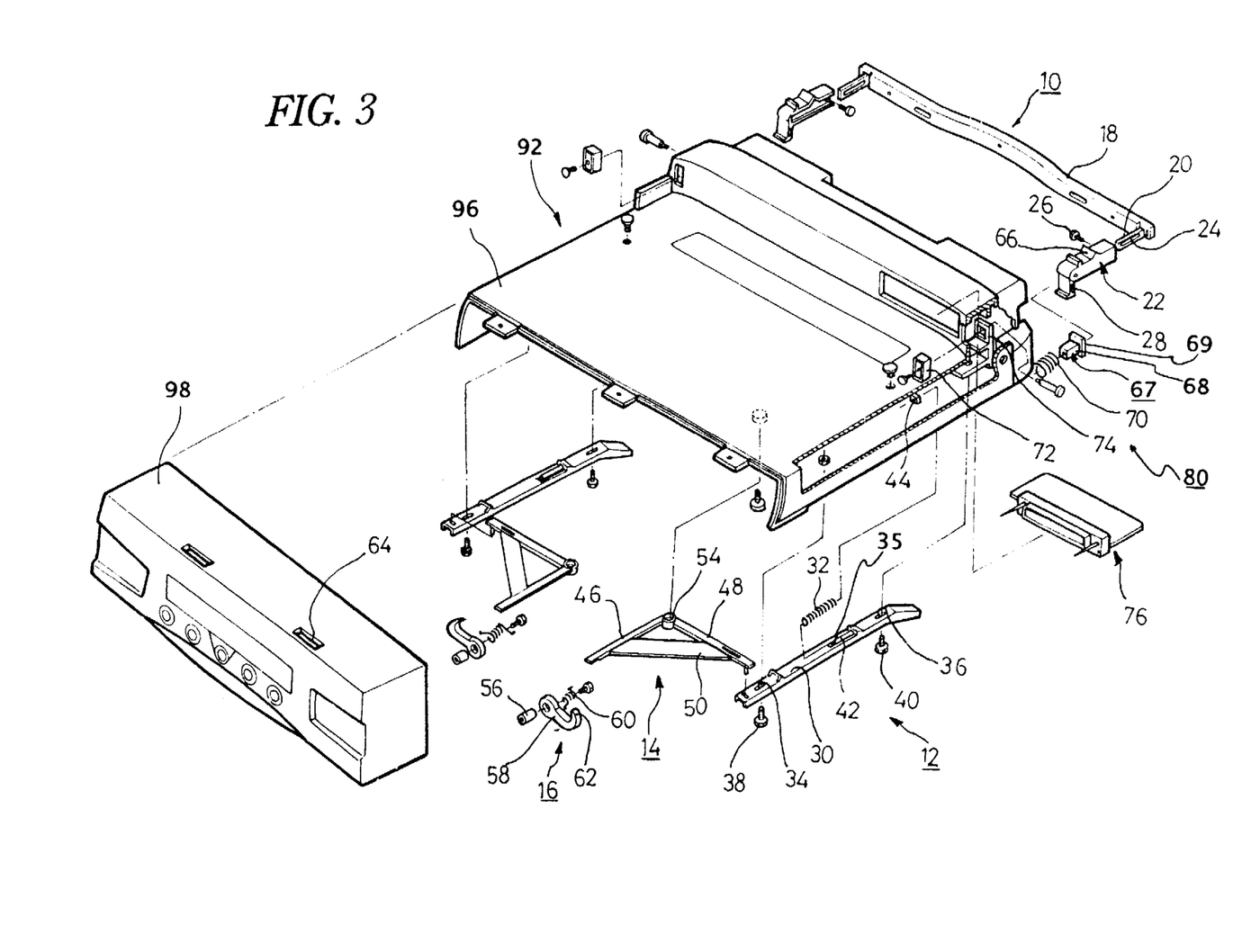
FIG. 3 is an exploded perspective view illustrating a locking device for locking a notebook computer onto a docking station according to an embodiment of the present invention.
Figure 4:
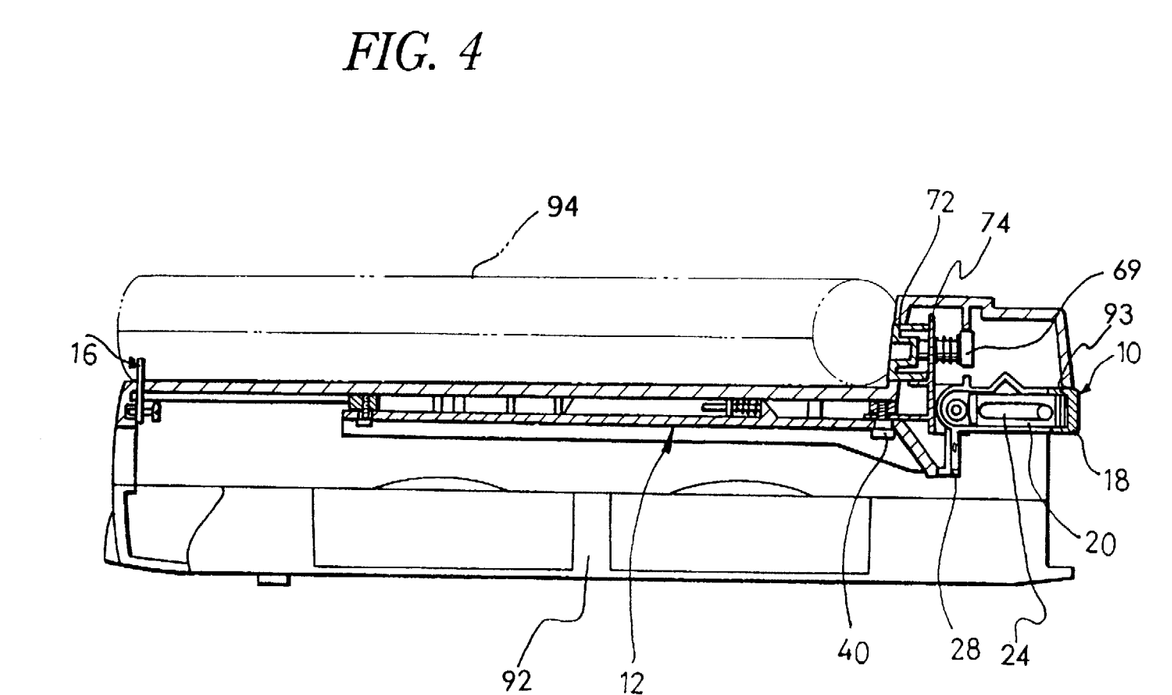
FIG. 4 is a side view of a notebook computer engaged to a docking station with the safety detent mechanism activated to prevent inadvertent disengagement of the notebook computer from the docking station.

Referring to FIGS. 2, 3 and 4, docking station 92 may be constructed with a housing 96 for installing various peripheral devices, and front cover 98 attached to the front of housing 96. In FIG. 2, notebook computer 94 is shown docked on top of docking station 92. Inside docking station 92, the five clusters of parts that enable notebook computer 94 to engage, disengage, and eject from docking station 92 are handle mechanism 10, push-slide mechanism 12, lever mechanism 14, locking mechanism 16, and ejecting mechanism 80. With the exception of handle bar 18 of handle mechanism 10, each of these clusters of parts appear twice in several of the drawings, once on the left side and once again on the right side of docking station 96. The handle mechanism, the lever mechanism, the push slide mechanism, the locking mechanism, and the ejecting mechanism all act in concert so that when handle bar 18 is rotated to a horizontal position while notebook computer 94 is resting on top of docking station 92, locking mechanism 16 engages notebook computer 94 to docking station 92, and when handle bar 18 is rotated to a first upturned position, locking mechanism 16 releases notebook computer 94 from docking station 92. When handle bar 18 is further upturned beyond the first upturned position, handle bar 18 reaches a second upturned position which causes ejecting mechanism 80 to eject notebook computer 94 from docking station 92. Handle bar 18 may also be used to carry the entire docking station 92.

Figure 6A:
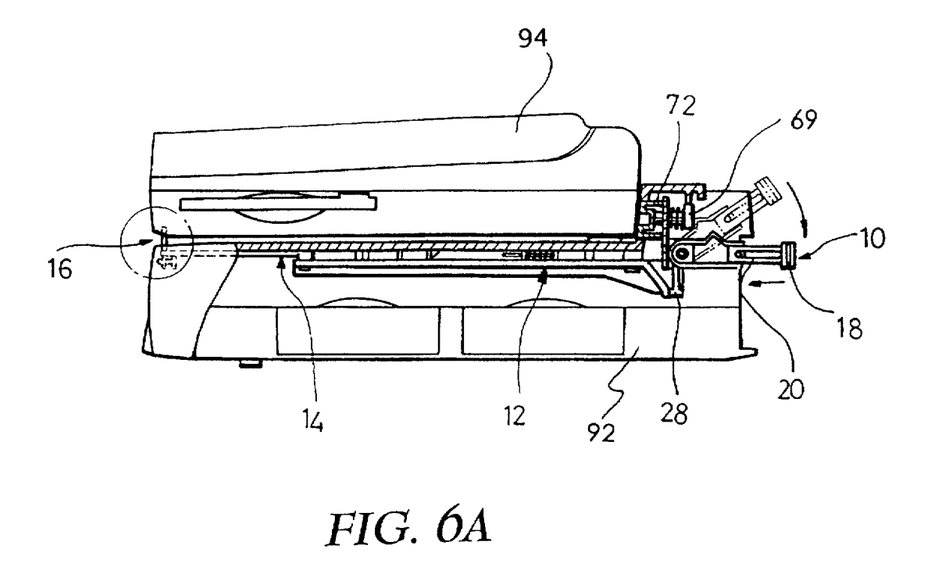
FIGS. 6A and 6B are a side view of a notebook computer engaged to a docking station without either the safety or detent mechanism activated.
Figure 6B:
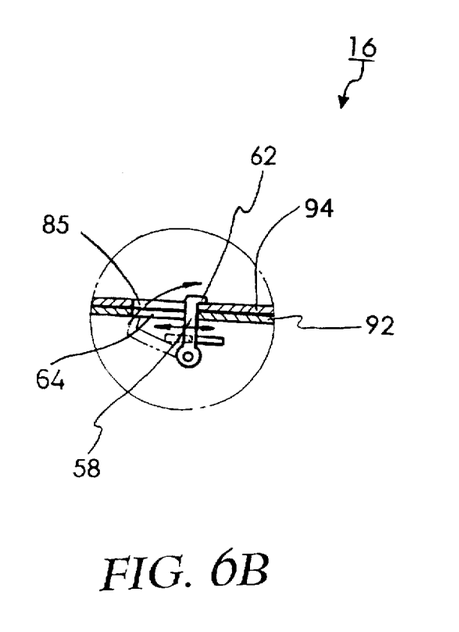

Referring to FIG. 3 in conjunction with FIGS. 6A and 6B, each of the pair of locking mechanisms 16 includes a hook 58 pivotably mounted on boss 56 attached to front cover 98, and an elongated aperture 64 formed on the top side of the front cover 98 for passing hook 58 through to engage catching receptacle 85 on the underside of notebook computer 94. Locking mechanism 16 may also be attached to housing 96 instead of front cover 98. Hook 58 has an inward curved portion 62, which is projected upward through aperture 64 by the resilient force of first resilient member 60 (e.g., a coiled spring). It is this inward curved portion 62 of locking mechanism 16 that latches docking station 92 to the notebook computer 94. While it is the resilient force of first resilient member 60 that biases hooks 58 to an engaged position, it is the pulling force of lever mechanism 14 that overcomes this spring bias to cause hooks 58 to rotate back to a disengaged position.

Each lever mechanism 14 is an L-shaped member with a distal end of a first branch 46 contacting the hollow inside of hook 58 of locking mechanism 16, and the distal end of a second branch 48 pivotably connected with the front of push slide mechanism 12. A pivotal hole 54 for inserting a pivot is formed in the corner portion of lever mechanism 14 where the proximal ends of branches 46 and 48 are joined. In addition, connecting bar 50 is provided for connecting the distal ends of branches 46 and 48 together.

Each push slide mechanism 12 includes a flat slide strip 30 with the front end pivotably connected with the distal end of second branch 48 of lever mechanism 14, and the rear end of flat slide strip 30 being slightly bent downward and in contact with handle mechanism 10, a longitudinally elongated opening 35 formed in slide strip 30 for receiving second resilient member 32, guide pin 42 integrally formed with the rear end of elongated opening 35 for holding second resilient member 32, and a ring-shaped guide projection 44 for receiving guide pin 42 with second resilient member 32 positioned thereon. A pair of guide slots 34 and 36 are guided by a pair of guide bolts 38 and 40 mounted at the front and rear ends respectively of each slide strip 30 for guiding the direction to which slide strips 30 move and by limiting the distance by which slide strips 30 travel.

Figure 8:
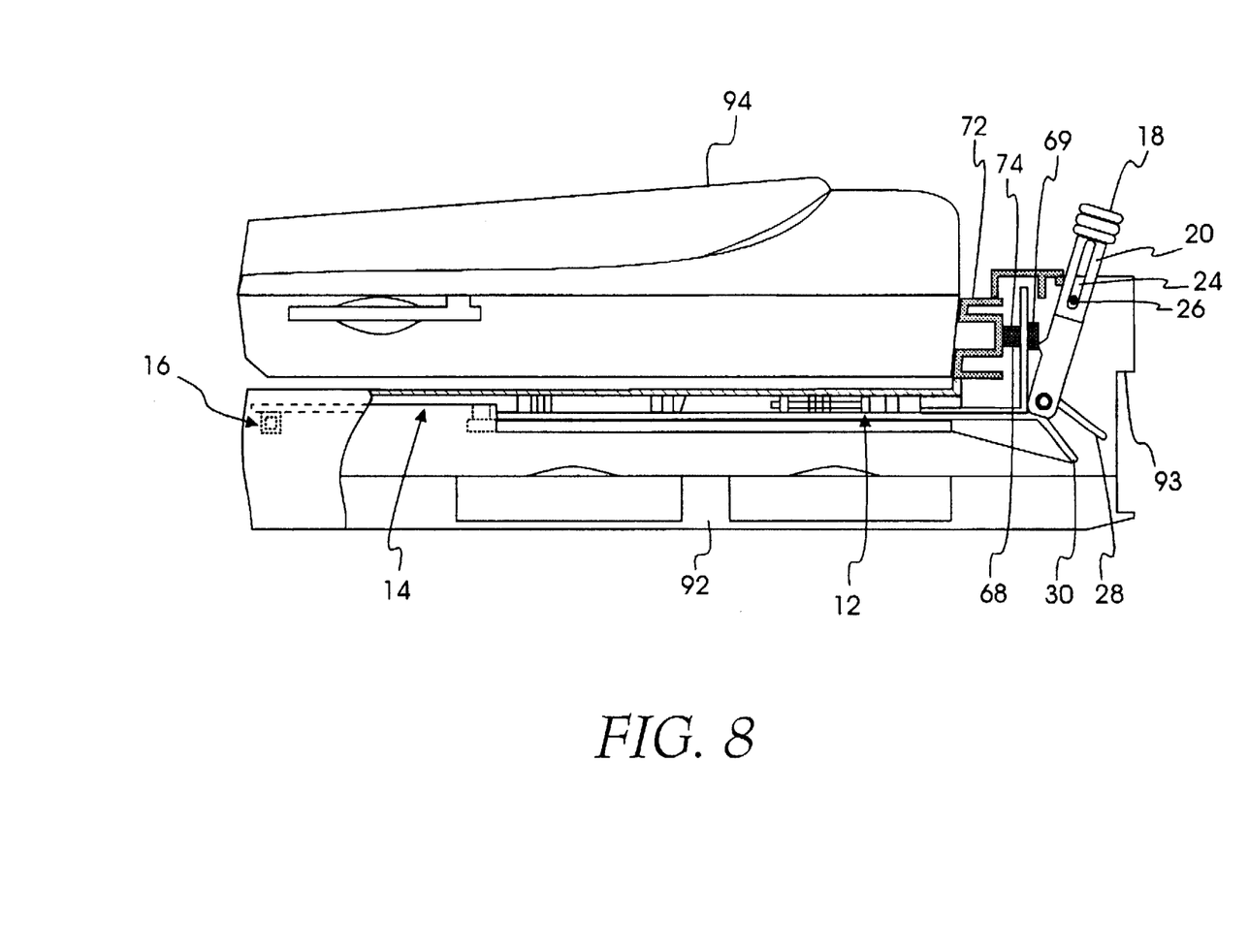
FIG. 8 is a side view of the notebook computer being ejected from the docking station by turning the handle bar to a second upturned position.

The handle mechanism 10 includes a handle bar 18 which can be gripped by one or by both hands of a user, and a pair of L-shaped hinge members 22 fixedly connected to both ends of handle bar 18 by connecting strips 20. Hinge members 22 are pivotably attached to both sides of the rear of housing 96. Each of the hinge members 22 has a slide push projection portion 28 for pushing the corresponding slide strips 30 when handle bar 18 is pivoted to the horizontal position as shown by the solid lines in FIG. 6A, and an ejection push projection portion 66 for pushing the back of notebook computer 94 when handle bar 18 is pivoted upwards, as shown in FIG. 8.

Each ejecting mechanism 80 includes an ejection push projection portion 66 of hinge member 22 of handle mechanism 10, a loop-shaped support 74 fixed on the top side of housing 96, a push rod 67 constructed with a flange 69 and a stem 68, a coil spring 70 for receiving stem 68 of push rod 67 where coil spring 70 positioned in between flange 69 of push rod 67 and loop-shaped support 74, and a contact piece 72 fixedly attached to the end of stem 68. Stem 68 is inserted into the opening of the loop-shaped support 74 so as to cause push rod 67 to be retracted backward by the resilient force of coil spring 70 without being detached from loop-shaped support 74 when handle bar 18 is moved to the horizontal position. When handle bar 18 is rotated to the uppermost position shown in FIG. 8, the pushing force of the ejection push projection portion 66 of hinge 22 opposes and overcomes the biased resilient force of coil spring 70, thereby causing contact pieces 72 to push forward the back of notebook computer 94, thus causing an electrical connection established between the rear of notebook computer 94 and docking station 92 at electrical connector 76 to become severed.

Figure 5:
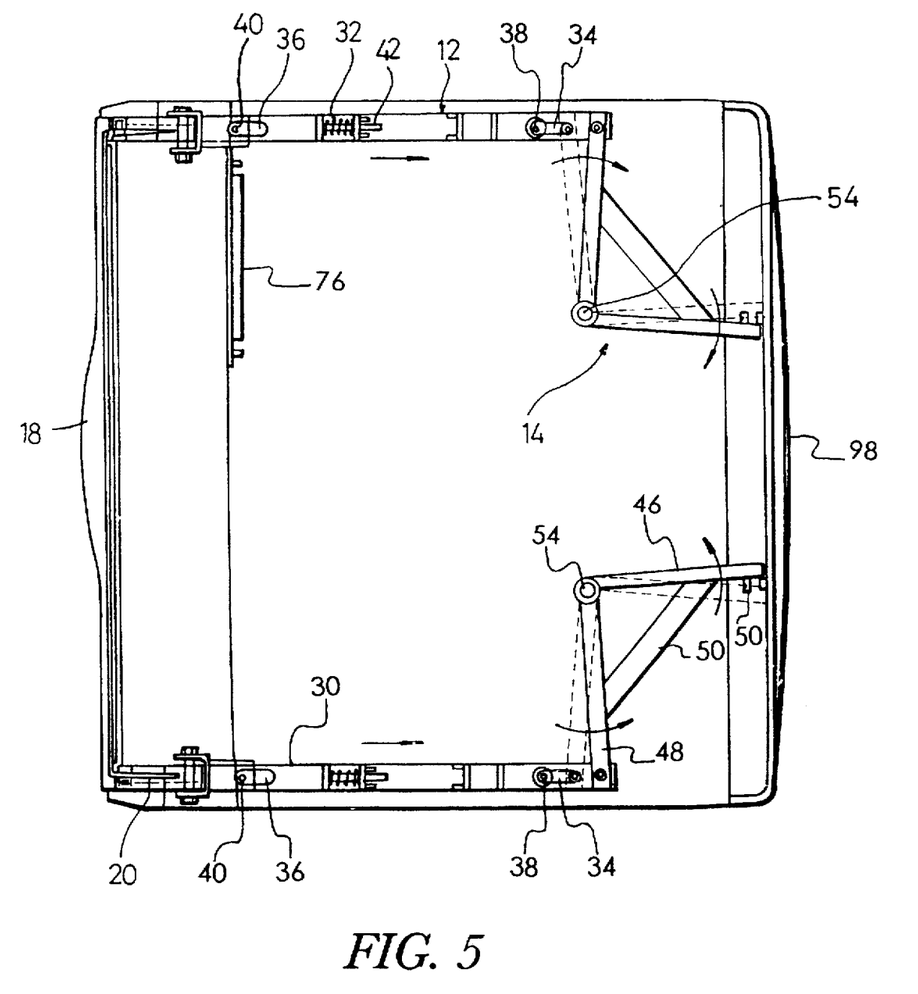
FIG. 5 is a top view of FIG. 4 showing the docking station where the handle mechanism and the part clusters are all in their engaged positions, showing the safety detent mechanisms activated.

Before assembly, docking station 92 is usually found with handle bar 18 in an upturned position. Notebook computer 94 is slid onto the top side of docking station 92 so that the electrical connection port in the rear of notebook computer 94 mates with the electrical connector 76 on docking station 92. After notebook computer 94 is mounted on docking station 92, handle bar 18 of handle mechanism 10 is moved to the horizontal position indicated by the solid lines in FIG. 6A from the upturned position indicated by the phantom lines in FIG. 6A. Simultaneously, slide push projection portions 28 of hinge members 22 of handle mechanism 10 forwardly push slide strips 30 against the resilient force of second resilient member 32, causing the front ends of slide strips 30 to move forward causing the distal end of second branch 48 of the lever mechanism 14 to be pushed forward. Hence, first branches 46 of lever mechanism 14 are rotated inwardly, thereby allowing hooks 58 to rotate upwardly through elongated apertures 64 of front cover 98 by the resilient force of first resilient member 60. This causes curved portions 62 of hooks 58 to inserted into receptacles 85 in the bottom of notebook computer 94 to firmly engage the underside of notebook computer 94 against docking station 92. The slide strips 30, the lever mechanism 14, and hooks 58 are moved as shown by solid lines in FIG. 5 when notebook computer 94 is engaged to docking station 92. After hooks 58 engage notebook computer 94 to docking station 92, handle bar 18 is pushed inward to the position shown in FIG. 4. This radial motion of handle bar 18 engages a safety or detent feature by placing handle bar 18 beneath overhang 93 of the rear side of docking station 92, thereby preventing the inadvertent rotation of handle bar 18, thus preventing the inadvertent disengagement of notebook computer 94 from docking station 92.

Figure 7:
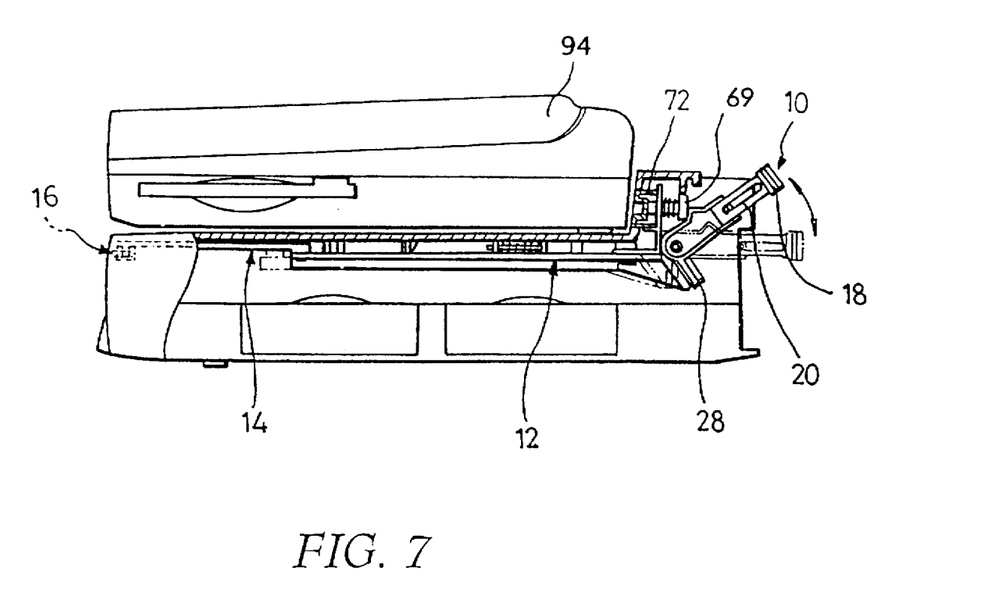
FIG. 7 is a side view of a notebook computer on top of a docking station but unlatched from the docking station where said handle bar is in a first upturned position.

When detaching notebook computer 94 from docking station 92, the first step is to disengage the detent or safety mechanism. This is done by retracting handlebar 18 outwardly in a radial direction from what is shown in FIG. 4 to the position shown by the solid lines in FIG. 6A. Now, handle bar 18 is free to rotate and will not be obstructed by overhang 93. The next step is to rotate or pivot upwards handle bar 18 to the first upturned position as shown by the solid lines in FIG. 7. This allows the resilient force of second resilient member 32 to push slide strips 30 backward causing lever mechanism 14 to be pivoted backwardly to the position indicated by the dotted lines in FIG. 5, thereby causing hooks 58 to be pivoted against the bias of first resilient member 60 so that hooks 58 release notebook computer 94 from docking station 92. To eject, handle bar 18 is pivoted further upwards to a second upturned position as shown in FIG. 8. This causes the ejection push projection portion 66 of handle mechanism 10 to overcome the resilient force of coiled spring 70, causing push rod 67 and contact pieces 72 of ejecting mechanism 80 push the back of notebook computer 94 forward, causing notebook computer 94 to become detached from docking station 92, causing the electrical connection between notebook computer 94 and docking station 92 at electrical connector 76 to separated, and allowing a user to lift notebook computer 94 off from horizontal surface 96 of docking station 92.

What is claimed is:

1. A locking device in combination with a docking station, comprising:

a pair of locking means located at a front of said docking station pivotably attached to said docking station, each said locking means comprised of a first resilient member;

a pair of lever means pivotably mounted on said docking station for respectively moving said pair of locking means between an engaged position, to firmly hold an underside of a notebook computer resting on the top side of said docking station to said docking station at two points sufficiently spaced out for stability, to a disengaged position, to release said underside of the notebook computer from said docking station;

a pair of push slide means slidably mounted and extending lengthwise from front to rear on said docking station for reciprocally engaging said pair of lever means;

a handle hinged to a rear of said docking station, comprised of a handle bar selectively pivoted between a horizontal position and a first upturned position, making said pair of push slide means slide either forward or backward respectively to either engage or disengage respectively said pair of locking means to or from said underside of the notebook computer; and said pair of push slide means for pushing said pair of lever means to pivot to a forward position causing said pair of locking means to pivot to said engaged position by the resilient force of said first resilient members when said handle is turned to said horizontal position, said pair of push slide means for moving to a backwards position pivoting said pair of lever means to a backwards position, pivoting said pair of locking means to said disengaged position when said handle is turned to said upturned position.

2. A locking device as defined in claim 1, further comprising a pair of ejecting means for pushing the back of the notebook computer forward when said handle bar is pivoted to a second upturned position.

3. A locking device as defined in claim 1, with each of said pair of locking means further comprising:

a hook pivotably mounted on said docking station; and an elongated aperture formed on a top side of said docking station to remove said hook when moving between said disengaged position to said engaged position, and allowing said hook to latch an engaging receptacle on the underside of the notebook computer resting on said top side of said docking station.

4. A locking device as defined in claim 1, with each of said pair of lever means comprising:

an L-shaped member containing two branches, with a distal end portion of a first branch being in contact with a hook of said locking means;

a distal end portion of a second branch of said two branches being pivotably connected to a corresponding one of said push slide means;

a juncture of a proximal end portion of said two branches perforated by a pivotable hole for inserting a pivot; and a connecting bar joining together said distal end portions of said two branches.

5. A locking device as defined in claim 1, with each of said pair of push slide means further comprising:

a slide strip with a front end pivotably connected to a distal end of said second branch of said lever means;

a rear end of said slide strip connected to said handle;

means for both guiding a sliding motion of said slide strip and for limiting said sliding motion of said slide strip to within a sliding range; and a second resilient member biased to allow said slide strip to automatically return to said backwards position when said handle means is turned to said first upturned position.

6. A locking device as defined in claim 1, with said handle further comprising:

a handle bar; and a pair of hinge members fixedly connected to both ends of said handle bar by a pair of connecting strips, said hinge members pivotably attached to both sides of said rear of said docking station, each of said hinge members comprising:

a slide push projection portion for pushing a corresponding one of said push slide means when said handle bar is moved to said horizontal position, and an ejection push projection portion for pushing the back of the notebook computer forward when said handle bar is pivoted to said second upturned position.

7. A locking device as defined in claim 6, where each of said pair of ejecting means comprises:

a third resilient member mounted on said top side of said docking station for pushing the back of the notebook computer forward, said third resilient member comprising:

a loop-shaped support member fixed on said top side of said docking station, a push rod comprised of a stem portion and a flange portion, a coil spring for receiving said stem portion of said push rod, said coil spring being located between said flange of said push rod and said loop-shaped support member, and a contact piece attached to an end of said stem of said push rod, said stem being inserted into an opening of said loop-shaped support member so as to draw said push rod backward by the resilient force of said coil spring of said third resilient member without said push rod becoming detached from said loop-shaped support member when said handle bar is pivoted to said horizontal position; and said ejection push projection portion for pushing said third resilient member when said handle bar is turned to said second upturned position.

8. A locking device as defined in claim 7, where said first and second resilient members are each comprised of a coil spring.

9. A locking device as defined in claim 6, where each of said push slide means further comprises:

a longitudinally elongated opening formed in said flat slide strip for receiving said second resilient member;

a guide pin integrally formed towards the rear of said elongated opening for holding said second resilient member;

a ring-shaped guide projection for receiving said guide pin and said second resilient member located on said guide pin;

a pair of guide slots, each respectively formed near each said end of said slide strip; and a pair of guide bolts mounted in said docking station, each projecting through corresponding ones of said pair of guide slots to guide said sliding motion of said slide strip and to limit said sliding motion of said slide strip to said sliding range.

10. A locking device as defined in claim 6, with said hinge members being L-shaped.

11. The handle means of claim 6, further comprising:

a pair of connecting strips on opposite sites of said handle where said handle attaches to said computer docking station;

a pair of longitudinally elongated slots, each located on corresponding ones of said pair of connecting strips; and a pair of guide bolts, each inserted through corresponding ones of said pair of longitudinally elongated slots, said pair of guide bolts guide said connecting strips and said handle to move in a direction towards or away from said docking station.

12. The locking device of claim 11, where said handle may be used to carry said docking station.

13. The locking device of claim 2, where said ejecting means is capable of severing an electrical connection between said docking station and said back side of the notebook computer.

14. The locking device in claim 3, where the notebook computer is comprised of:
a pair of slots on said underside of a front of the notebook computer positioned so as to accommodate said pair of latching rotatable hooks of said docking station; and
an electrical connector located in a rear of the notebook computer that mates with an electrical connector on said docking station when the notebook computer is slid on said top side of said docking station.

15. A method for engaging a notebook computer to a computer docking station, comprising:
positioning said notebook computer on top of said computer docking station and sliding said notebook computer towards a rear of said computer docking station causing:
an electrical connection to be established between said notebook computer and said docking station, and
a pair of catching receptacles on an underside of said notebook computer positioned directly above a pair of rotatable hooks attached to said docking station where said pair of hooks can be pivoted into said pair of catching receptacles;
pivoting a handlebar to a horizontal position from an upturned position causing said pair of rotatable hooks to release to a biased force causing said pair of rotatable hooks to rotate to engage said catching receptacles on said underside of said notebook computer; and
pushing said handlebar inward underneath an overhang on said rear of said computer docking station preventing the disengagement of said notebook computer from said docking station by preventing the pivoting of said handlebar.

16. The method of claim 15, where said engagement of said notebook computer to said docking station does not depend on the operation of electronic circuits.

17. The method of claim 15, where pivoting said handlebar to said horizontal position forces a pair of push slide means to slide forward forcing a pair of lever means to rotate causing said pair of rotatable hooks to release to said biased force causing said pair of rotatable hooks to rotate to and engage said catching receptacles on said underside of said notebook computer.

18. A method of disengaging and ejecting a notebook computer from a computer docking station, comprising:
retracting a handlebar from underneath an overhang on a rear side of said computer docking station, allowing said handlebar to pivot;
pivoting said handlebar from a horizontal position to a first upturned position forcing a pair of latching hooks to rotate and become disengaged from a pair of catching receptacles on an underside of said notebook computer, and
continuing to pivot said handlebar away from said horizontal position to a second upturned position, causing a pair of contact pieces to push a back side of said notebook computer forward, causing an electrical connection between said docking station and said back side of said notebook computer to become severed.

19. The method of claim 18, where said disengagement and said ejection of said notebook computer from said docking station does not depend on the operation of electronic circuits.

* * * * *